UNITED STATES PATENT OFFICE.

HENRY LAUFERTY, OF NEW YORK, N. Y.

MANUFACTURE OF ARTIFICIAL BUTTER OR OLEOMARGARINE.

SPECIFICATION forming part of Letters Patent No. 265,833, dated October 10, 1882.

Application filed August 16, 1882. (No specimens.)

*To all whom it may concern:*

Be it known that I, HENRY LAUFERTY, of the city, county, and State of New York, have invented certain new and useful Improvements in the Manufacture of Artificial Butter or Oleomargarine, of which the following is a specification.

It is my object to avoid the use of vegetable oils and the like commonly used for the purpose of preventing oleomargarine-butter from becoming crumbly at low temperatures, and also to obtain a larger yield from milk or cream of the creamy substance which should be mixed with oleomargarine-oil to produce a good quality of artificial butter. The agent with which I treat both the milk and the oil is sal soda deprived of its water, and the manner in which I proceed is as follows: I take ordinary sal-soda, which I grind or pulverize into a fine powder, then spread out in a room, the temperature of which should be kept at about 100° Fahrenheit. At the end of about twenty-four hours the sal-soda will become white and the water contained in it will have evaporated.

*Preparation of the milk.*—Of this prepared sal-soda I take about six ounces to a can of milk containing about ten gallons. The milk containing this proportion of the sal-soda should be kept for about twelve hours in a room of a temperature of 62° Fahrenheit. The action of the prepared sal-soda will run the milk to about 70° Fahrenheit. At the end of the twelve hours the milk will appear slightly thickened and will have a slightly-salty taste. I then churn this product about five minutes, until it becomes foamy or cream-like, taking care not to carry the operation so far as to allow any butter globules to appear. By this process of treating the milk I obtain a larger percentage out of the milk, and the creamy substance is perfectly sweet. The residue whey or buttermilk is drawn off slowly, leaving the creamy substance entirely free therefrom.

*Treatment of the oil.*—I take of oleomargarine-oil about two hundred pounds in a cold liquid state. To this I add eight ounces of the prepared sal-soda, and agitate them thoroughly until the mass becomes mushy and of a whitish cream color. The soda is by this time thoroughly intermingled with the oil. I then melt the oil so prepared until it becomes a liquid. It will be perfectly clear, and no sediment will be found remaining. I then run the oil thus prepared into the churn containing the prepared creamy substance above described, and churn for about thirty minutes. I then add coloring, churn five minutes longer, then remove the mass from the churn, place it on tables, and salt. The product will be perfectly sweet and of the consistency of natural butter, and also having the same grain without that greasy and heavy appearance usually to be seen in oleomargarine.

My product will be light in weight, and will yield a larger volume in bulk, owing to the action of the sal-soda, and also to the addition of the milk as prepared, which would otherwise be lost in whey or buttermilk.

Oleomargarine so prepared will keep sweet and retain the salt longer than ordinary artificial butter. Besides this, the granular formation of the oil is broken, and hence it avoids the crumbling, which is a great detriment to oleomargarine in winter, and enables me to dispense with use of any substances—such as vegetable oils, &c.—commonly used to prevent its crumbling.

What I claim as new, and desire to secure by Letters Patent, is—

The improvement in the manufacture of artificial butter or oleomargarine which consists in treating in the manner described both the milk and the oleomargarine-oil separately with sal-soda, prepared and taken in the proportions as specified, then mixing or churning the creamy substance produced from the treated milk with the prepared oleomargarine-oil, and coloring, salting, and working the mixture, as hereinbefore set forth.

In testimony whereof I have hereunto set my hand this 12th day of August, 1882.

HENRY LAUFERTY.

Witnesses:
ALBERT MARX,
LOUIS ECKSTEIN.